(12) United States Patent
Godet et al.

(10) Patent No.: US 10,723,183 B2
(45) Date of Patent: Jul. 28, 2020

(54) METHOD FOR IDENTIFYING THE WHEELS OF A MOTOR VEHICLE

(71) Applicants: Continental Automotive France, Toulouse (FR); Continental Automotive GmbH, Hannover (DE)

(72) Inventors: Sylvain Godet, Saint-Cezert (FR); Stéphane Billy, Grenade (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/470,669

(22) PCT Filed: Dec. 19, 2017

(86) PCT No.: PCT/FR2017/053684
§ 371 (c)(1),
(2) Date: Jun. 18, 2019

(87) PCT Pub. No.: WO2018/197759
PCT Pub. Date: Nov. 1, 2018

(65) Prior Publication Data
US 2020/0086695 A1 Mar. 19, 2020

(30) Foreign Application Priority Data
Dec. 23, 2016 (FR) .................................... 16 63311

(51) Int. Cl.
*B60C 23/04* (2006.01)
*B60T 8/171* (2006.01)
(Continued)

(52) U.S. Cl.
CPC ...... *B60C 23/0416* (2013.01); *B60C 23/0437* (2013.01); *B60C 23/0489* (2013.01);
(Continued)

(58) Field of Classification Search
CPC ... B60C 23/0489; B60T 8/125; B60T 2270/10
See application file for complete search history.

(56) References Cited

U.S. PATENT DOCUMENTS

| 9,783,009 B2 | 10/2017 | Kessler et al. |
| 9,884,524 B2 | 2/2018 | Guinart et al. |

(Continued)

FOREIGN PATENT DOCUMENTS

| FR | 3002492 A1 | 8/2014 |
| KR | 20130032114 A | 4/2013 |
| WO | 2015090554 A1 | 6/2015 |

OTHER PUBLICATIONS

English Translation of the Written Opinion for International Application No. PCT/FR2017/053684, dated Apr. 19, 2018—5 pages.
(Continued)

*Primary Examiner* — Mohamed Charioui
(74) *Attorney, Agent, or Firm* — RatnerPrestia

(57) ABSTRACT

A method whereby a central unit carried on board a motor vehicle can identify the wheels of a motor vehicle, by locating a radiofrequency black spot for transmissions between a wheel unit with which a wheel of a motor vehicle is equipped and a wheel-monitoring central control unit carried on board the vehicle, a wheel angle encoding independent of the transmission being in any case performed in order to measure the true rotation of the wheel at a given instant. A string of successive frames providing full angular coverage of the wheel is transmitted from the wheel unit, a receive rate for the frames being established and analyzed in order to detect at least one spot of poorer reception corresponding to the at least one black spot, the angle encoding providing an angle of rotation of the wheel at the instant of detection of the at least one black spot.

11 Claims, 4 Drawing Sheets

(51) Int. Cl.
*B60T 8/172* (2006.01)
*G01B 15/00* (2006.01)

(52) U.S. Cl.
CPC ............ *B60T 8/171* (2013.01); *B60T 8/1725* (2013.01); *G01B 15/00* (2013.01); *B60T 2270/10* (2013.01)

(56) References Cited

U.S. PATENT DOCUMENTS

| | | | |
|---|---|---|---|
| 2003/0058118 A1* | 3/2003 | Wilson | B60C 23/0423 340/679 |
| 2005/0229693 A1* | 10/2005 | Desai | B60C 23/0416 73/146 |
| 2012/0029767 A1* | 2/2012 | Bailie | B60C 23/0416 701/36 |
| 2015/0073677 A1 | 3/2015 | Kretschmann et al. | |

OTHER PUBLICATIONS

International Search Report and Written Opinion for International Application No. PCT/FR2017/053684, dated Apr. 19, 2018, 8 pages.

* cited by examiner

METHOD FOR IDENTIFYING THE WHEELS OF A MOTOR VEHICLE

CROSS REFERENCE TO RELATED APPLICATIONS

This application is the U.S. National Phase Application of PCT International Application No. PCT/FR2017/053684, filed Dec. 19, 2017, which claims priority to French Patent Application No. 1663311, filed Dec. 23, 2016, the contents of such applications being incorporated by reference herein.

FIELD OF THE INVENTION

The present invention relates to a method for identifying the wheels of a motor vehicle employing a method for locating at least one black spot for radiofrequency transmissions between a wheel unit fitted to a wheel of a motor vehicle and a wheel-monitoring central control unit carried on board the vehicle, a receive rate for frames transmitted between the wheel unit and the central unit in one revolution of the wheel associated with the wheel unit being established for each frame transmitted.

The present invention for its implementation uses a wheel angle encoding independent of the transmission and which is in any case performed in order to measure the true rotation of the wheel at a given instant, for example by an anti-lock braking system for the wheels, also known by its abbreviation ABS.

BACKGROUND OF THE INVENTION

Because monitoring tire pressures is essential to the safety of motor vehicles, pressure-monitoring systems, such as TPMS systems, have been created to perform this function and installed on motor vehicles.

These chiefly comprise sensors which measure the pressure in the tires and transfer this measurement to a wheel-monitoring central control unit which is carried on board the vehicle. This central unit collects and analyzes the tire pressure data via wireless links. The result of these analyses is generally displayed on the dashboard of the vehicle. Such a system is therefore able to inform the driver of the tire pressure in real time, or just produce a visual or audio announcement if pressure anomalies are detected by this system.

A stream of various information coming from each wheel unit associated with a wheel is transmitted via radiofrequency link to the wheel-monitoring central control unit of the motor vehicle. The performance of this wireless link is directly impacted by the various vehicle platform profiles, such as, for example, van, sedan, etc. The parameters that need to be taken into consideration may include the length of the vehicle, whether or not the chassis is reinforced, and the materials used in the construction of the vehicle. Certain vehicles will exhibit zones in which transmission is deficient, these being more commonly referred to as "black spots", in which the wireless signal is not transmitted.

These black spots are highly problematic. Specifically, if a frame of information is transmitted and finds itself in such a black spot, the frame is lost. This is of particular relevance in assistance with the inflation of tires of a vehicle, which is performed when the vehicle is stationary, this being referred to as being in immobilized mode. In these instances in which the vehicle is stopped, if the wheel unit is in a black spot, this spot remains the spot from which the wheel unit transmits throughout the time for which the vehicle is stopped. The level of reception of the signals at the wheel-monitoring central control unit drops to the point at which these signals may become inaudible and prevent the inflation assistance from working.

These black spots may be caused for example by the position of the transmitter antenna of a wheel unit, by reflection off the ground of part or of all of the transmitted signal, or by the relative position of the wheel unit with respect to the wheel-monitoring central control unit.

In order to alleviate this problem of black spots, standard protocols have been devised which send identical frames in packets of two, three or four or even more in order to improve the information reception rate. The probability of the information not being transmitted decreases with the number of frames transmitted. The counterpart to this is increased battery power consumption and therefore a shorter life for the wheel unit.

A protocol has also been devised that has a standard fixed inter-frame time for which the reception quality is dependent on a predetermined sensitivity of the reception of information transmissions between a wheel unit and the wheel-monitoring central control unit. However, there is no correlation between such a reception assessment criterion and the number of frames actually transmitted, which means that this criterion is not objective.

SUMMARY OF THE INVENTION

The problem underlying aspects of the present invention is locating at least one radiofrequency black spot for transmissions between a wheel unit fitted to a wheel of a motor vehicle and a wheel-monitoring central control unit carried on board the vehicle in order first of all to locate the wheel unit in the vehicle and then optimize transmissions between the wheel unit and the central control unit so as to allow said central unit carried on board the vehicle to identify at least one wheel of said vehicle from among the other wheels of said vehicle.

To this end, an aspect of the invention relates to a method whereby a central unit carried on board a motor vehicle can identify at least one wheel of a motor vehicle from among the other wheels of the vehicle. The method is notable in that:

at least one black spot is located in accordance with a method for locating at least one radiofrequency black spot for transmissions between and a wheel unit with which a wheel of a motor vehicle is equipped and a wheel-monitoring central control unit carried on board the vehicle, a receive rate for frames transmitted between the wheel unit and the central unit in one revolution of the wheel associated with the wheel unit being established for each frame transmitted, a wheel angle encoding independent of the transmission being in any case performed in order to measure the true rotation of the wheel at a given instant, and whereby a string of successive frames providing angular coverage of the associated wheel is transmitted from the wheel unit, the receive rate being analyzed in order to detect at least one spot of poor reception corresponding to said at least one black spot, the angle encoding providing an angle of rotation of the wheel at the instant of detection of said at least one black spot, and a respective angle of rotation of the wheel which is achieved at the instant of protection of said at least one black spot is associated with said at least one black spot, the respective angle of rotation of the wheel at the instant of detection of said at least one black spot for the wheel unit associated with said at least one wheel being stored in memory in order to establish, for said at least one wheel, a respective signature formed by a pair of said at least one black spot with the angle of rotation at the instant of detection, said at least one wheel being recognized from among the other wheels of the motor vehicle by its signature.

The chief advantage of such identification is that each wheel possesses its own signature, which is then used to identify its location on the vehicle. The identification method just like the location method also works when driving in a straight line and does not require special driving conditions such as, for example, changes of direction of the vehicle. The convergence time in a straight line is shortened.

The signature need not be learned beforehand. The identification method just like the location method do not require additional usage or additional components because the methods simply employ the basic functions of a transmitter in the wheel unit and of a receiver in the wheel-monitoring central control unit.

During driving, the receiver, namely the wheel-monitoring central control unit, can therefore learn from the radiofrequency performances and an identifier of the wheel unit and thus identify and locate a wheel. When the wheels are replaced, the receiver is capable of locating a wheel-unit identifier from the radiofrequency performance of its link, which is information stored in memory beforehand.

The technical effect is that the black spot or black spots is or are located by precise measurement of the wheel angle at which this or these black spot(s) appear. There may be one or more black spots affecting the one same wheel. This can be done by using, on the one hand, the receive rate, conferring upon it a function other than its prime function for identifying sharp drops in the receive rate which are indicative of a black spot.

Furthermore, use is made of the wheel angle measurement, already present within the vehicle for example for the purposes of an anti-lock braking system for the wheels of the vehicle. It then follows that, as these two functions were already present in the vehicle, this makes it possible to have a location solution that does not require a great deal of modification to the set of wheel units and central control unit. The modifications required by implementation of aspects of the present invention are practically all software modifications, making them less expensive.

Advantageously, the string of frames is made up of a number x of bursts each containing N frames, the bursts being repeated at least until full angular coverage of the associated wheel has been achieved, each burst with the exception of the first beginning directly at the end of the previous burst.

The protocol for communication between the wheel unit of the wheel and the wheel-monitoring central control unit positioned in the vehicle is thus managed dynamically by ensuring that none of the frames occupy the same angular position regardless of the speed of the vehicle.

Such a protocol with standard inter-frame intervals allows the frames receive rate to be exploited. This solution makes it possible to build up the performance of the radiofrequency link. When the signal received is higher than the sensitivity of the sensor, the receive rate is at a maximum. By contrast, when the signal is lower, the receive rate dips, this being indicative of a respective black spot.

Advantageously, the bursts are transmitted over one or more consecutive revolutions of the wheel as long as said at least one black spot has not been detected.

Advantageously, when the wheel unit comprises an accelerometer, according to a detection of a current speed of the motor vehicle which is obtained from a measurement from the accelerometer, there are calculated, on the one hand, a current duration of rotation of the wheel and, on the other hand, an angular range for the current rotation of the wheel that corresponds to a predetermined frame transmission duration.

Advantageously, a start time $t\alpha$ measured from the point of transmission of the first frame upon motor vehicle start-up is defined for a frame $\alpha$ using the following equation:

$$t_\alpha = f(360°*k) + \Sigma(t_t*N_{\alpha-1})$$

k being the number of revolutions of the wheel, $f(360°*k)$ a function that converts $360°*k$ into a time, $t_t$ a predetermined transmission duration for the frame, and $N_{\alpha-1}$ the number of frames already transmitted prior to the frame $\alpha$.

Advantageously, when the wheel unit has no accelerometer, the speed of the vehicle being evaluated from the wheel angle encoding, the bursts of frames are transmitted continuously, a frames transmission duration higher than an elapsed time that can be calibrated being indicative of a wheel revolution performed.

Advantageously, the method is implemented for each wheel of the motor vehicle.

An aspect of the invention finally relates to an assembly of a wheel-monitoring central control unit, of an anti-lock braking system for the wheels, and of wheels of a motor vehicle, each wheel comprising a wheel unit equipped with a transmission device, the anti-lock braking system for the wheels comprising an angle encoder measuring the actual rotation of each wheel at a given instant and means for transmitting measurements of the actual rotation of each wheel to the wheel-monitoring central control unit, the transmission device of the wheel unit of each wheel transmitting radiofrequency waves toward the wheel-monitoring central control unit, notable in that the wheel-monitoring central control unit implements a location method or an identification method as described hereinabove, the central control unit comprising means for detecting at least one transmission black spot and means for storing in memory a pair made up of said at least one black spot with an angle of rotation of the wheel as measured by the angle encoder of the anti-lock braking system for the wheels that is current at the instant of detection of said at least one black spot.

The black spot location performed by the wheel-monitoring central control unit allows the signature of the wheel to be sent back dynamically to the wheel unit thus avoiding transmitting in a black spot. However, this is possible only if transmissions between each wheel unit and the central control unit are two-way transmissions. This then allows the wheel-monitoring central control unit of the vehicle to be aware of the location of the black spots and, if need be, to relay information to the driver.

As mentioned previously, the assembly of a wheel-monitoring central control unit, of an anti-lock braking system for the wheels, and of wheels of a motor vehicle with their specific wheel unit uses functions that already exist within the wheel unit, namely the microcontroller and, where appropriate, the speed feedback for the dynamic inter-frame interval calculation but also within the receiver, namely the wheel-monitoring central control unit, which is to say the frame receive rate.

This assembly allows precise qualitative evaluation at low speed of the performance of the radiofrequency link while at the same time ensuring good repeatability of the measurements. As a result it becomes far easier to site the wheel unit within the vehicle at a location that offers the best radiofrequency link performance.

It becomes easier to locate black spots, something which is particularly advantageous so that the vehicle does not remain parked with the wheel unit stuck in a black spot.

BRIEF DESCRIPTION OF THE DRAWINGS

Other features, objects and advantages of aspects of the present invention will become apparent upon reading the detailed description that will follow and upon examining the appended drawings, given by way of nonlimiting examples and in which.

DETAILED DESCRIPTION OF THE PREFERRED EMBODIMENTS

In what follows, reference will be made to all of the references of the figures considered in combination in order to refer to an element of the assembly or a step of the method according to an aspect of the invention. Reference will therefore be made to all the figures considered in combination.

Figure 1:
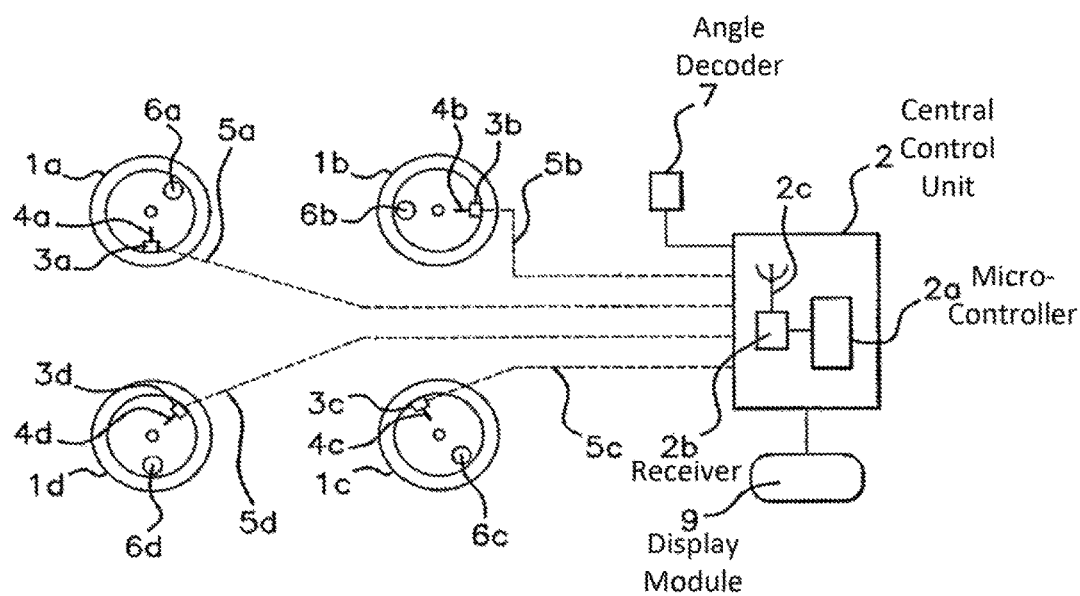
FIG. 1 illustrates an assembly of a wheel-monitoring central control unit, of an anti-lock braking system for the wheels, and of wheels of a motor vehicle, each wheel comprising a wheel unit fitted with a transmission device, it being possible for this assembly to implement the method according to an aspect of the present invention.

With reference more particularly to the basic diagram of FIG. 1, the four wheels 1a to 1d of a motor vehicle, not shown, are each equipped with a wheel unit 3a to 3d. These wheel units 3a to 3d comprise antennas 4a to 4d, forming a transmission device, which transmit signals transmitted by radiofrequency links 5a to 5d toward a wheel-monitoring central control unit 2 of the vehicle.

The four wheels 1a to 1d may also each comprise a motion sensor 6a to 6d, although this is not compulsory. The motor vehicle may comprise more than four wheels, being for example a truck having more than four wheels. The term vehicle is to be considered in its broadest sense as potentially being a personal vehicle, just as it may be a utility vehicle or a collective transport vehicle having more than four wheels.

Each of the wheel units 3a to 3d periodically via a wireless link symbolized in dotted line transmits information to the wheel-monitoring central control unit 2.

The wheel-monitoring central control unit 2 may also receive, from outside, information coming from a system independent of this unit, this information regarding the angular position of each wheel from an angle encoder 7 that measures the actual rotation of each wheel at a given instant and is electrically connected to the wheel-monitoring central control unit 2. This angle encoder 7 forms part of a system other than the assembly comprising the wheel-monitoring central control unit 2 and the wheel units 3a to 3d.

The wheel-monitoring central control unit 2 is intended to continuously analyze the information provided by the wheel units 3a to 3d and, where applicable, by the motion sensors 6a to 6d: for example pressure, temperature, acceleration and "moving or stationary" state in the example illustrated.

The wheel-monitoring central control unit 2 includes at least the following elements: a microcontroller 2a, a receiver 2b and an antenna 2c. This wheel-monitoring central control unit 2 thus receives the signals coming from the wheel units 3a to 3d with respective powers that will vary depending on the position of the antennas 4a to 4d and on the environment of the wheel units 3a to 3d and the wheel-monitoring central control unit 2.

For example, the engine and the equipment of the vehicle may influence the environment of the wheel units 3a to 3d and interfere with, the signals, in particular through reflections off the ground. Black spots may thus be created.

These power variations may lead to low levels of reception by the wheel-monitoring central control unit 2. After analyzing the received information, the wheel-monitoring central control unit 2 may display, on a display module 9, the relevant information for the driver, in particular, but non-limitingly: immediate warning in the event of a severe drop in pressure for at least one tire and, for minor drops in pressure, for example of less than 0.10 bar, warning communicated only when the vehicle is next stationary. This may also be performed on the screen of a mobile telephone equipped with the appropriate application.

The signals from each wheel unit 3a to 3d to the central control unit 2 are modulated radiofrequency signals. The wheel-monitoring central control unit 2 may in return communicate with each wheel unit 3a to 3d, advantageously at low frequency.

With reference to all the figures and more particularly to FIGS. 1, 3 to 5, an aspect of the present invention relates to a method for locating at least one black spot Bs. This black spot corresponds to a specific angular range extending around the wheel. The spot may also be an isolated spot.

Transmission is performed by radiofrequency between a wheel unit 3a to 3d with which a wheel 1a to 1d of a motor vehicle is fitted and a wheel-monitoring central control unit 2 carried on board the vehicle, a frames receive rate Tram Ar for frames T1 to T3 transmitted between the wheel unit 3a to 3d and the central unit 2 in one revolution of the wheel 1a to 1d associated with the wheel unit 3a to 3d being established for each frame T1 to T3 transmitted.

As a general rule, there may be several black spots Bs for the one same wheel 1a to 1d, and the location method is not in any way restricted to the location of a single black spot Bs, and the location is performed on the entire revolution of the wheel.

Independently of the transmission of frames T1 to T3 by the wheel unit 3a to 3d, angle encoding is also performed by the angle encoder 7 of the wheel in order to measure the actual rotation of the wheel is to 1d at a given instant. This can be done by an anti-lock braking system for the wheels, or ABS. As an alternative, this can be done by an electronic control system that regulates the dynamic stability of the vehicle, known by the abbreviation ESP.

According to an aspect of the present invention, the wheel unit 3a to 3d emits a string of successive frames T1 to T3 providing complete angular coverage of the associated wheel 1a to 1d. This is because it is at least necessary to accomplish a revolution of the wheel 1a to 1d in order to position all the black spots Bs, the probability of there being several black spots Bs being higher as a general rule than that of having a single black spot Bs.

The receive rate Tram Ar is analyzed to detect at least one zone of lower reception corresponding to the black spot(s) Bs on the wheel. The angle encoding 7 is used to give an angle of rotation of the wheel 1a to 1d at the instant at which each black spot Bs is detected. In this way, one or more pairs can be performed combining each black spot Bs with an angle of rotation of the wheel 1a to 1d at the instant of detection. It then follows that the black spot(s) Bs are detected and located with respect to the associated wheel 1a to 1d, with their angular range determined.

Figure 2:
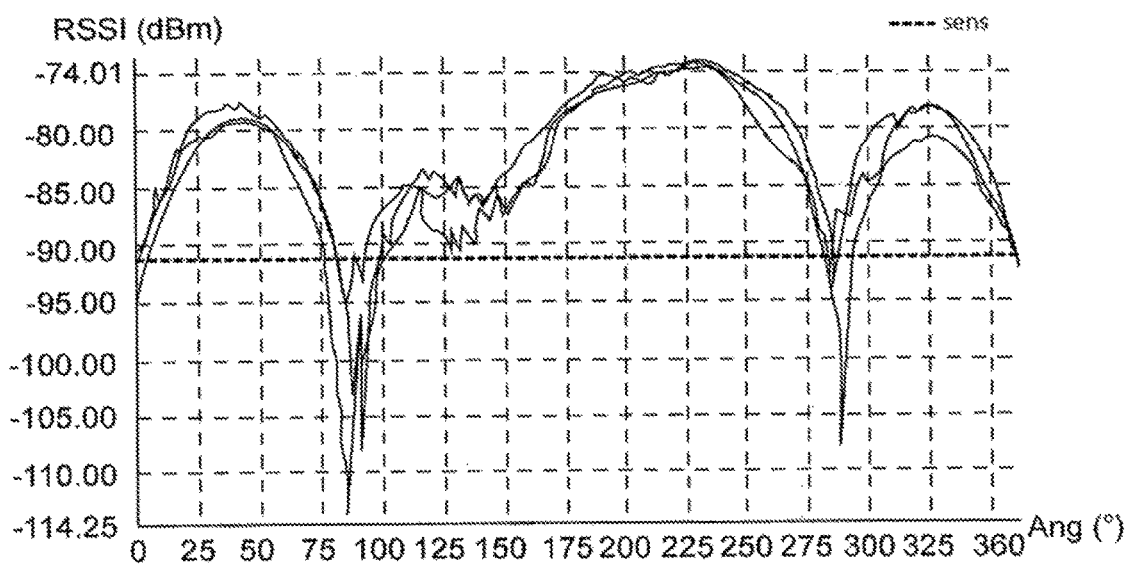
FIG. 2 shows a curve of the measurements of reception power of a signal emitted by a wheel unit to a wheel-monitoring central control unit, one or more black spots being detected on the basis of sensitivity according to a method according to the prior art.
Figure 3:
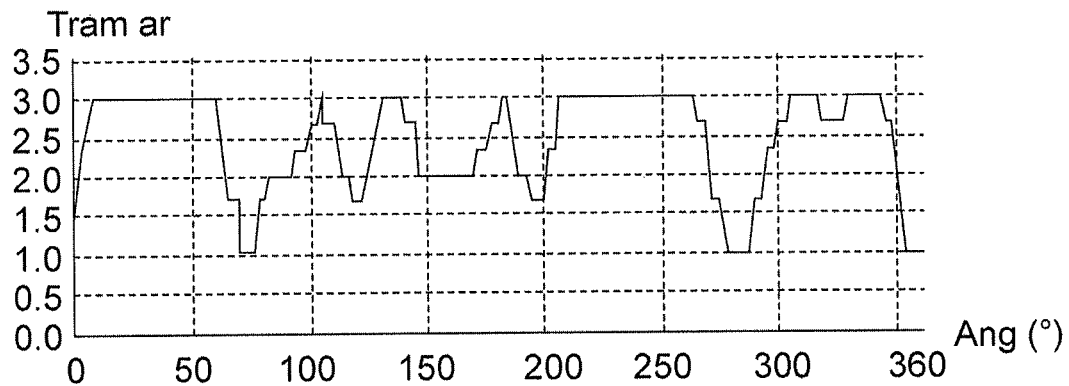
FIG. 3 shows a curve of frame receive rate by the wheel-monitoring central control unit as a function of the angle of rotation of the wheel bearing the wheel unit, the receive rate being used to locate one or more black spots in a method according to an aspect of the present invention.

FIGS. 2 and 3, while referring also to FIG. 1, depict one example of the performance of the radiofrequency link between a wheel unit 3a to 3d in a wheel 1a to 1d and the wheel-monitoring central control unit 2 carried on board the vehicle. The communication protocol here employs a fixed time interval between each frame T1 to T3.

FIG. 2 illustrates the performance of the radiofrequency link for a full revolution of the wheel. The radiofrequency antenna of the wheel unit 3a to 3d transmits power, the solid lines showing the RSSI which is a measure of the received power of the signal received, the power being quoted in decibels or dBm. The signal, made up of three frames T1 to T3, is received by the wheel-monitoring central control unit 2 as a function of the angle of rotation Ang of the wheel is to 1d, expressed in degrees.

According to the prior art, use is made of the sensitivity of the receiver below which the signal will no longer be received, and which is considered to correspond to black spots Bs. In FIG. 2, three black spots Bs can be made out, these respectively lying in an angular range centered on wheel angles of 0°, 87.5° and 287.5°. On the horizontal dotted line that symbolizes the sensitivity of the sensor, it is possible to make out the angular positions of the three frames spaced apart by a fixed time interval which may be 150 milliseconds and 120 milliseconds in FIG. 2.

FIG. 3 illustrates the evaluation of the mean value of the frames receive rate, which value is referenced on the ordinate axis by Tram Ar which is variable dependent on the starting angle, referenced Ang, of the first frame on the abscissa axis, the angle being measured in degrees. This is because, in a motor vehicle, it is not possible to predict what the initial starting angle for the first frame will be. This is why all the configurations over a revolution of the wheel, namely from 0° to 360° of angle are considered.

The location method of an aspect of the present invention, based on the receive rate Tram Ar is valid whatever the level of sensitivity of the receiver present in the wheel-monitoring central control unit 2. It is possible to evaluate the performance of the radiofrequency link between the wheel unit 3a to 3d and the wheel-monitoring central control unit 2 directly. This characterization may be very precise at low speed, for example at speeds lower than 20 km/h because the angular occupation of the frame will define the sampling rate for the performance of the radiofrequency link.

The technical solution proposed is to use the frames receive rate Tram Ar to measure the performance of the radiofrequency link through the development of a dynamic protocol. This will be described in greater detail later.

The principle behind the method according to an aspect of the invention is to dynamically manage the protocol for communications between the wheel unit 3a to 3d in the wheel 1a to 1d and the central control unit 2 positioned in the vehicle, ensuring that none of the frames occupy the same angular position regardless of the speed of the vehicle.

Figure 4:
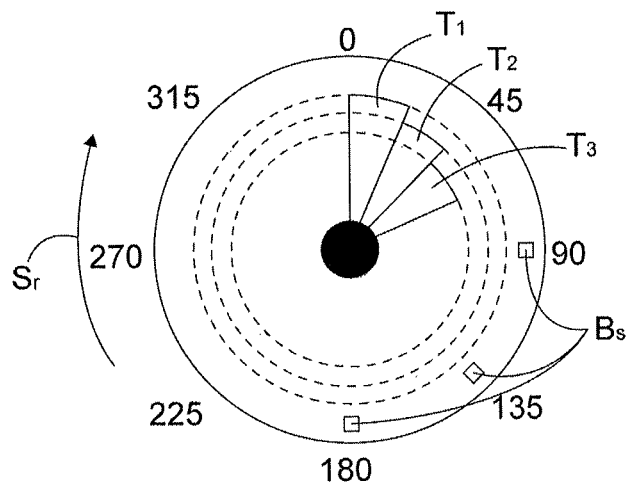
FIG. 4 illustrates a wheel with a burst of three frames emitted by the wheel unit.
Figure 5:
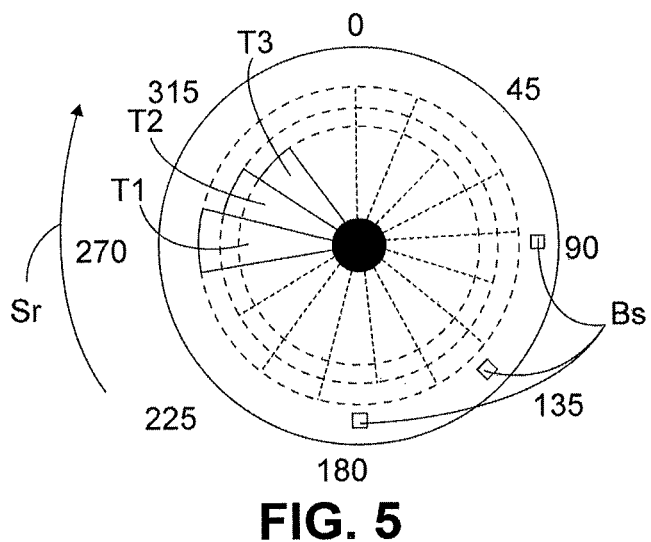
FIG. 5 illustrates a wheel with bursts of three frames close to having achieved full coverage of the revolution of the wheel, the bursts being transmitted in accordance with a method according to an aspect of the present invention, FIGS. 6 and 7 each show one respective embodiment of the method for identifying a wheel after locating one or more black spots, the embodiment of FIG. 6 being for a wheel unit comprising an accelerometer and the embodiment of FIG. 7 being without an accelerometer for the wheel unit.

Thus, in a preferred embodiment of an aspect of the invention, and with reference notably to FIGS. 4 and 5, the string of frames T1 to T3 is made up of a number x of bursts each containing N frames T1 to T3, the bursts being repeated at least until full angular coverage of the associated wheel 1a to 1d has been achieved, each burst with the exception of the first beginning directly at the end of the previous burst.

FIG. 4 shows a burst of three frames T1, T2 and T3, and FIG. 5 shows the consecutive bursts of three frames T1, T2 and T3 toward the end of completion, by the frames T1 to T3, of a revolution of the wheel which is not yet complete. The black spots are referenced Bs. When one of the frames T1, T2 and T3 is sent at an angle corresponding to a black spot Bs, this frame T1 to T3 does not reach the central control unit 2. In FIGS. 4 and 5, the black spots Bs are located respectively at the angles 90°, 135° and 180°, although these are nonlimiting. The wheel is to 1d rotates in the wheel direction of rotation Sr.

The angular impact of the bursts T1, T2 and T3 when the vehicle is in motion is depicted here in FIG. 4 which illustrates the sending of the first burst. The inter-frame intervals are defined in such a way that the second burst begins at the end of the first burst, that the third burst begins at the end of the second burst, and so on, until full angular coverage of the wheel 1a to 1d is achieved, which may happen after N bursts.

In FIGS. 4 and 5, 45, 90, 135, 180, 225, 270, 315 mark the angle of rotations around the wheel 1a to 1d, an angle of 360° not referenced in FIGS. 4 and 5 signifying a full revolution of the wheel 1a to 1d. The bursts may be emitted over one or more consecutive revolutions of the wheel as long as the black spot(s) Bs have not been detected.

Figure 6:
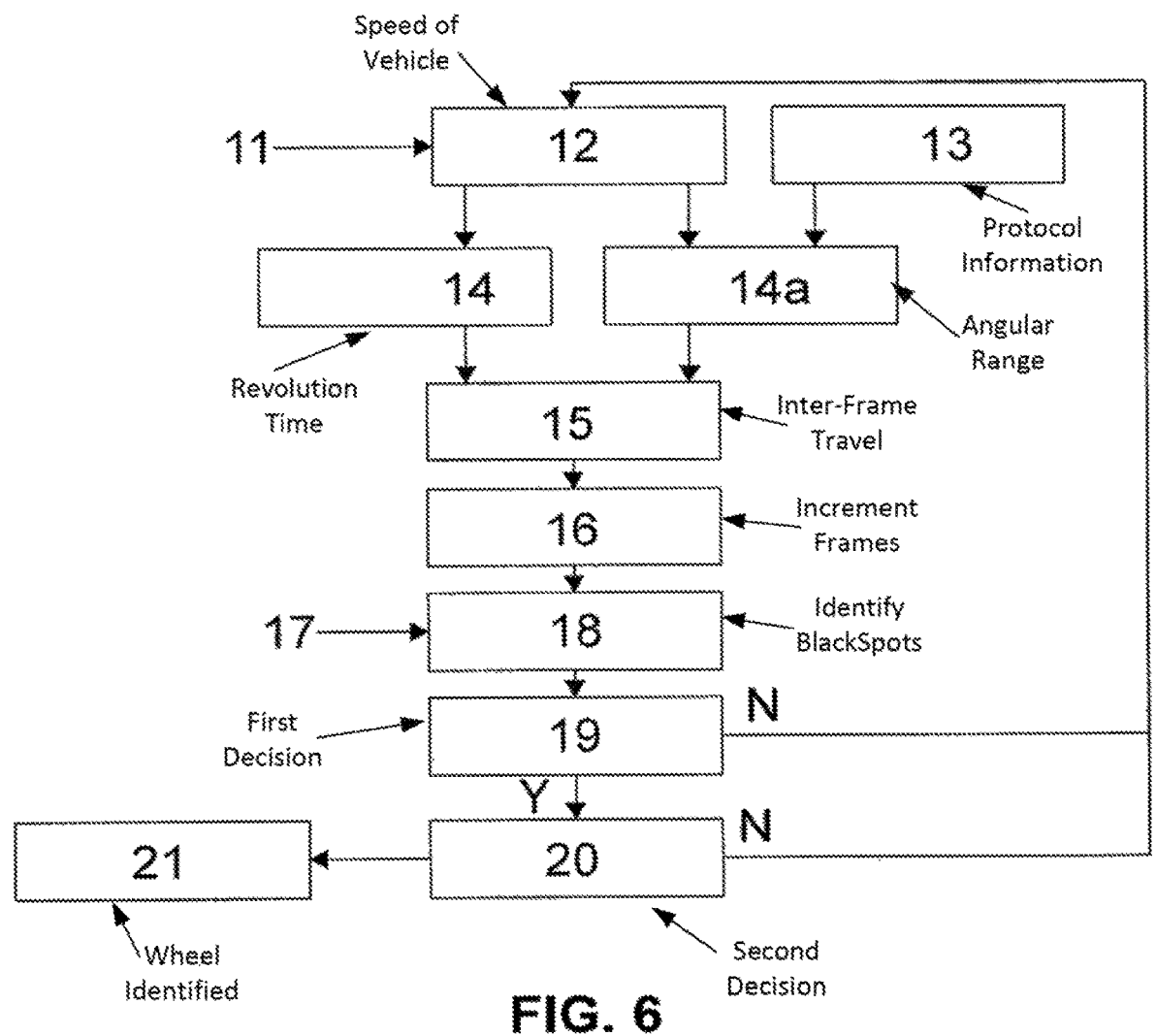
Figure 7:
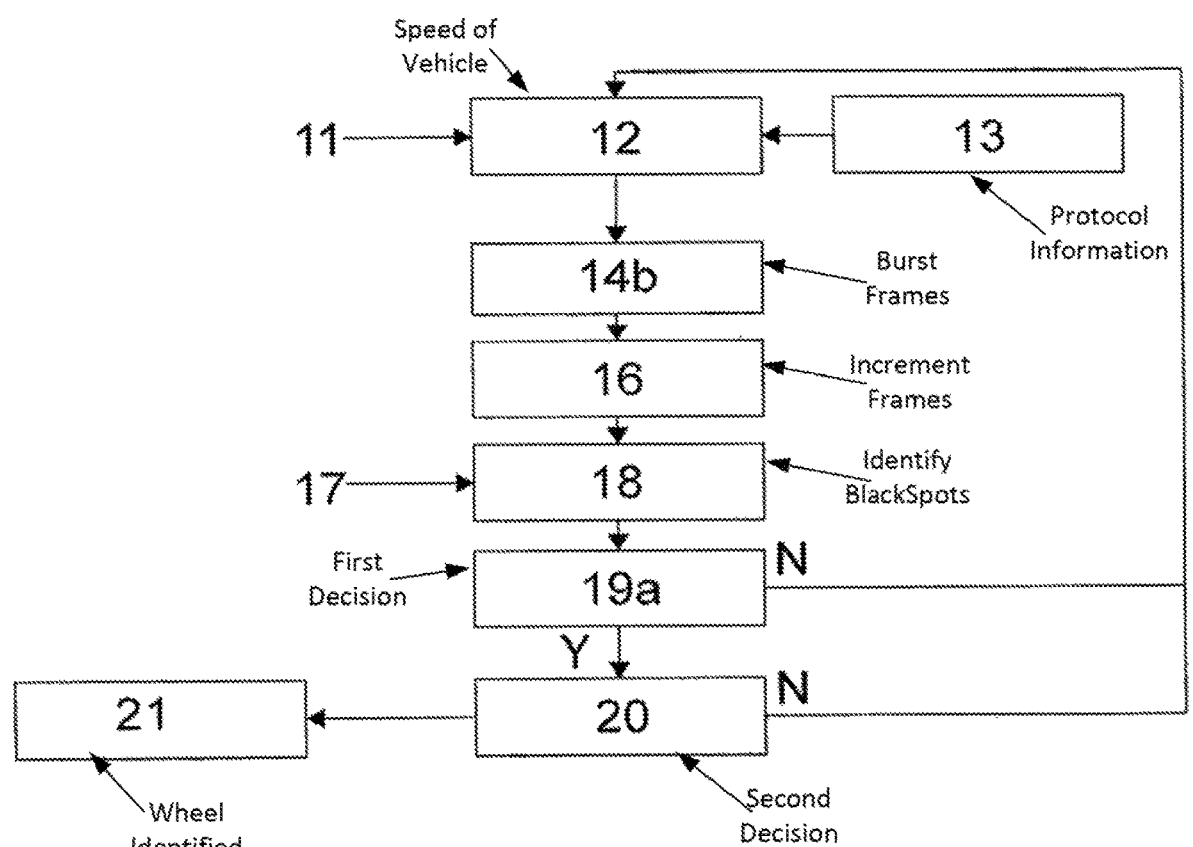

FIGS. 6 and 7 respectively show a flow diagram of one preferred embodiment of the location method according to an aspect of the present invention, which location method can be incorporated into a method whereby a central unit 2 carried on board a motor vehicle can identify at least one wheel 1a to 1d of a motor vehicle from among the other wheels of the vehicle.

In effect, after locating one or more black spot(s) Bs in accordance with a location method as described hereinabove or which of which embodiments will be described with reference to FIGS. 6 and 7, with reference also to the other figures, a respective angle of rotation of the wheel 1a to 1d reached at the instant of detection of said at least one black spot Bs is associated with each black spot Bs. When this black spot Bs is relatively wide, an angular range may also be associated therewith.

The central unit 2 stores in memory the respective angle of rotation of the wheel 1a to 1d at the instant of detection of said at least one, black spot Bs for the wheel unit 3a to 3d associated with said at least one wheel 1a to 1d. The central unit 2 therefore establishes, for said at least one wheel is to 1d, a respective signature made up of a pair of said at least one black spot Bs and the angle of rotation at the instant of detection, said at least one wheel 1a to 1d being recognized by the central unit 2 from among the other wheels of the motor vehicle from its signature.

FIG. 6 relates to an embodiment of the location method that forms part of a method for identifying the wheel 1a to 1d for a wheel unit 3a to 3d comprising an accelerometer, whereas the wheel unit 3a to 3d used in the embodiment of FIG. 7 has no accelerometer.

In FIG. 6, while referring also to FIG. 1, a speed of the vehicle is determined, at 12, from a measurement from the accelerometer of the wheel unit 3a to 3d, this being referenced 11 in this FIG. 6. This can be accomplished by a microcontroller incorporated into the wheel unit 3a to 3d. The time taken to achieve a full revolution of the wheel is then calculated at 14, taking the vehicle speed into consideration.

Thus, when the wheel unit 3a to 3d comprises an accelerometer, according to a detection of a current speed of the motor vehicle which is obtained from a measurement from the accelerometer, there are calculated, on the one hand, at 14, a current duration of rotation of the wheel 1a to 1d and, on the other hand, at 14a, an angular range for the current rotation of the wheel 1a to 1d that corresponds to a predetermined frame transmission duration.

The calculation 14a of the angular range, also referred to as the angular impact of the frame, is performed taking account of the speed of the vehicle, but also taking account of the temporal dimension of the frame expressed, for example, in milliseconds. This is done on the basis of information on the protocol referenced 13 in FIG. 6.

The microcontroller incorporated into the wheel unit 3a to 3d can then calculate, at 15, the inter-frame interval. A frame start time tα, or frame start-of-transmission time, measured from the point of transmission of the first frame upon motor vehicle start-up can then be defined for a frame a using the following equation:

$$t\alpha = f(360°.k) + \Sigma tt.N\alpha - 1$$

k being the number of revolutions of the wheel, f(360°.k) a function that converts 360°.k into a time, tt a predetermined transmission duration for the frame, and Nα−1 the number of frames already transmitted prior to the frame α.

This is because 360°.k is expressed in degrees of angle and the total angle obtained after a number k of revolutions of a wheel can be converted into a time in milliseconds in order to be compatible with the second term of the second part of the above-mentioned equation, this second part being Σ tt. Nα−1 representing a time.

The number of frames is then incremented at 16, and increases from α to α+1.

The next step, referenced 18, regarding an analysis of the receive rate, referenced Tram Ar in FIG. 3, is an essential step of an aspect of the present invention.

The number of frames received by the receiver of the central unit can be analyzed at an instant t. A receive rate is thus defined by comparing the number of frames transmitted by a wheel unit which is the transmitting unit and the number of frames actually received by the receiving unit, which is the central unit. This is done systematically after predetermined periods of time have elapsed according to the prior art.

By contrast, the inventive contribution made by an aspect of the present invention lies in a compilation of all the frames received by the receiver and when the full coverage of all 360° of the wheel has been established, it is possible to use the receive rate Tram AR to determine black spots. These black spots are specific to the wheel unit. In a second phase, this frame receive rate specific to the wheel unit will make it possible to reference a frame rate signature specific to the position of the wheel unit on the vehicle.

For each black spot detected, a system other than the wheel unit 3a to 3d or the wheel-monitoring central control unit 2 encodes the angle in order to provide an angle of rotation of the wheel 1a to 1d at the moment of detection of each black spot Bs, the information pertaining to the angle of rotation of the wheel 1a to 1d being referenced 17. Each black spot Bs is thus identified in terms of angle on the associated wheel 1a to 1d.

A first decision point 19 determines whether the frames grouped together in consecutive bursts have achieved full coverage of a full rotation of the wheel 1a to 1d. If they have, as indicated by the output referenced Y for Yes at this first decision point 19, then a second decision point 20 is reached and used to determine whether a wheel signature for the wheels 1a to 1d has been recognized. 360° coverage of the wheel has been achieved. The receive rate Tram AR as a function of the angular position of the sensor of the wheel unit with respect to the wheel shows blackspots. This individual signature is made up of one or more pair(s) of black spots Bs with their detection angle or detection angular range.

If it has, as indicated by the output referenced Y for Yes at this second decision point 20, then it is considered that the wheel 1a to 1d has been identified, this being referenced 21. There is therefore a wheel signature for the wheel 1a to 1d, that has as many pairs comprising a black spot Bs and angle of rotation of the wheel 1a to 1d for this black spot as there are black spots Bs.

If the response at the first decision point 19 or the second decision point 20 is no, something which is symbolized by the output N at each of these first and second decision points 19 and 20, the method loops back to the initial step 12 of determining the speed of the vehicle.

This is because it is considered that, in the case of the first decision point 19, a complete revolution of the wheel has not been achieved so that there is the possibility that one or more black spot(s) Bs has (have) not yet been detected. It is also considered that, in the case of the second decision point 20, no signature has been recognized for, one or more transmission zones and that therefore the wheel 1a to 1d has not been able to be identified.

In FIG. 7, because the wheel unit 3a to 3d has no accelerometer, it is from information regarding the speed 11, provided by the angular-encoding system, that a speed of the vehicle is determined at 12. This can be done by a microcontroller incorporated into the wheel unit 3a to 3d giving consideration to information regarding the protocol. Bursts of frames T1 to T3 are then sent continuously at 14b.

The number of frames T1 to T3 is then incremented at 16, and increases from α to α+1. The next step, referenced 18, is the essential step in an aspect of the present invention, similar to the one mentioned in FIG. 6. What was stated with reference to FIG. 6 can be used again for the embodiment illustrated in FIG. 7, with the information regarding the angle of rotation being referenced 17 and performed by angular encoding. Each black spot Bs is thus identified in terms of angle on the associated wheel 1a to 1d.

A first decision point 19a determines whether a predetermined duration has elapsed. This length of time has been predetermined so that it corresponds to coverage of the wheel 1a to 1d over a full revolution by the frames T1 to T3 grouped together in consecutive bursts. A time margin may be added to this a length of time in order to be sure that coverage of the wheel 1a to 1d is complete. If it is, as indicated by the output referenced Y for Yes at this first decision point 19a, then a second decision point 20 is reached and used to determine whether a wheel signature for the wheel 1a to 1d has been recognized, the signature being made up of one or more pairs comprising black spot Bs and its associated detection angle.

If it has, as indicated by the output referenced Y for Yes at this second decision point 20, then it is considered that the wheel 1a to 1d has been identified, this being 15, referenced 21. There is therefore a wheel signature for the wheel 1a to 1d, that has as many pairs comprising a black, spot Bs and angle of rotation of the wheel 1a to 1d for this black spot as there are black spots Bs.

If the response at the first decision point 19a or at the second decision point 20 is no, something which is symbolized by the output N at each of these first and second decision points 19a and 20, the method loops back to the initial step 12 of determining the speed of the vehicle.

This is because it is considered that, in the case of the first decision point 19a, a complete revolution of the wheel has not been achieved so that there is the possibility that one or more black spot(s) Bs has (have) not yet been detected. It is also considered that, in the case of the second decision point 20, no signature has been recognized for one or more transmission zones and that therefore the wheel is to 1d has not been able to be identified.

In FIG. 7, when the wheel unit 3a to 3d has no accelerometer, the speed of the vehicle being evaluated from information regarding the angle of rotation of the wheel 17, using the wheel angle encoding, the bursts of frames are transmitted continuously, a frames transmission duration higher than an elapsed time that can be calibrated being indicative of a wheel revolution performed.

The method can be implemented for each wheel 1a to 1d of the motor vehicle, and all the wheels can thus be identified. Without this being limiting or compulsory, a preliminary identification of the wheels 1a to 1d may be performed at the time of manufacture of the motor vehicle, with the pairs comprising said at least one black spot Bs and the angle of rotation at the moment of detection being stored in memory for each wheel 1a to 1d. Their position on the motor vehicle is then known, the wheel-monitoring central control unit 2 recognizing each wheel 1a to 1d by comparing the current pairs against the pairs stored in memory.

With reference more particularly to FIG. 1, to implement the methods for locating one or more black spot(s), an aspect of the present invention also relates to an assembly of a wheel-monitoring central control unit 2, of an anti-lock braking system for braking the wheels 1a to 1d, and wheels 1a to 1d of a motor vehicle.

In this assembly, each wheel 1a to 1d comprises a wheel unit 3a to 3d equipped with a transmission device 4a to 4d which transmits radio waves toward the wheel-monitoring central control unit 2. The anti-lock braking system for the wheels 1a to 1d comprises an angle encoder 7 that measures the actual rotation of each wheel 1a to 1d at a given moment and means for transmitting the measurements of the actual rotation of each wheel 1a to 1d to the wheel-monitoring central control unit 2. It is the angle encoder 7 which communicates the information regarding the angle of rotation of the wheel to the central unit 2.

According to an aspect of the invention, the wheel-monitoring central control unit 2 comprises means for detecting at least one black spot Bs and means for storing in memory a pair made up of said at least one black spot Bs and an angle of rotation of the wheel 1a to 1d, measured by the angle encoder 7 of the anti-lock braking system for the wheels 1a to 1d, that is current at the moment of detection of said at least one black spot Bs.

The invention claimed is:

1. A method whereby a wheel-monitoring central unit carried on board a motor vehicle identifies at least one wheel of a motor vehicle from among the other wheels of the vehicle, the method comprising:
   establishing, by a processor of the wheel-monitoring central control unit carried on board the motor vehicle, in one revolution of a wheel associated with a wheel unit with which a wheel of the motor vehicle is equipped, a receive rate for frames transmitted between a transmitter of the wheel unit and a receiver of the wheel-monitoring central control unit,
   performing wheel angle encoding independent of the transmission to measure the true rotation of the wheel at a given instant, by transmitting, from the transmitter of the wheel unit a string of successive frames providing full angular coverage of the associated wheel,
   analyzing, by the processor of the wheel-monitoring central control unit, the receive rate of the successive frames to detect at least one radiofrequency black spot indicating a position of the wheel where reception quality is below a quality threshold, wherein the angle encoding provides an angle of rotation of the wheel at the instant of detection of said at least one radiofrequency black spot, and
   associating, by the processor of the wheel-monitoring central control unit, a respective angle of rotation of the wheel which is achieved at the instant of detection of said at least one radiofrequency black spot with said at least one radiofrequency black spot,
   storing in memory, by the processor of the wheel-monitoring central control unit, the respective angle of rotation of the wheel at the instant of detection of said at least one radiofrequency black spot for the wheel unit associated with said at least one wheel in order to establish, for said at least one wheel, a respective signature formed by a pair of said at least one radiofrequency black spot with the angle of rotation at the instant of detection, and
   recognizing, by the processor of the wheel-monitoring central control unit, said at least one wheel from among the other wheels of the motor vehicle by said signature.

2. The identification method as claimed in claim 1, wherein the string of frames is made up of a number x of bursts each containing N frames, the bursts being repeated at least until full angular coverage of the associated wheel has been achieved, each burst with the exception of the first beginning directly at the end of the previous burst.

3. The identification method as claimed in claim 2, wherein the bursts are transmitted over one or more consecutive revolutions of the wheel as long as said at least one black spot has not been detected.

4. The identification method as claimed in claim 2, wherein when the wheel unit comprises an accelerometer, according to a detection of a current speed of the motor vehicle which is obtained from a measurement from the accelerometer, calculating, on the one hand, a current duration of rotation of the wheel and, on the other hand, an angular range for the current rotation of the wheel that corresponds to a predetermined frame transmission duration.

5. The identification method as claimed in claim 4, wherein a start time tα measured from the point of transmission of the first frame upon motor vehicle start-up is defined for a frame α using the following equation:

$t_\alpha = f(360°*k) + \Sigma(t_t * N_{\alpha-1})$ k being the number of revolutions of the wheel, f(360° *k) a function that converts (360° *k) into a time, $t_t$ a predetermined transmission duration for the frame, and $N_{\alpha-1}$ the number of frames already transmitted prior to the frame α.

6. The identification method as claimed in claim 2, wherein when the wheel unit has no accelerometer, the speed of the vehicle being evaluated from the wheel angle encoding, the bursts of frames are transmitted continuously, a frames transmission duration higher than an elapsed time that can be calibrated being indicative of a wheel revolution performed.

7. The identification method as claimed in claim 1, wherein the method is implemented for each wheel of the motor vehicle.

8. An assembly of a wheel-monitoring central control unit, of an anti-lock braking system for wheels of a motor vehicle, each wheel comprising a wheel unit equipped with a transmission device, the anti-lock braking system for the wheels comprising an angle encoder measuring the actual rotation of each wheel at a given instant and means for transmitting measurement of the actual rotation of each wheel to the wheel-monitoring central control unit, the transmission device of the wheel unit of each wheel transmitting radiofrequency waves toward the wheel-monitoring central control unit wherein the wheel-monitoring central control unit implements an identification method as claimed in claim 1, the central control unit comprising means for detecting at least one black spot and means for storing in memory a pair made up of said at least one black spot with an angle of rotation of the wheel as measured by the angle encoder of the anti-lock braking system for the wheels that is current at the instant of detection of said at least one black spot.

9. The identification method as claimed in claim 3, wherein when the wheel unit comprises an accelerometer, according to a detection of a current speed of the motor vehicle which is obtained from a measurement from the accelerometer, calculating, on the one hand, a current duration of rotation of the wheel and, on the other hand, an angular range for the current rotation of the wheel that corresponds to a predetermined frame transmission duration.

10. The identification method as claimed in claim 3, wherein when the wheel unit has no accelerometer, the speed of the vehicle being evaluated from the wheel angle encoding, the bursts of frames are transmitted continuously, a frames transmission duration higher than an elapsed time that can be calibrated being indicative of a wheel revolution performed.

11. The identification method as claimed in claim 1, in which the method for locating at least one radiofrequency black spot for transmissions between a wheel unit with which a wheel of a motor vehicle is equipped and a wheel-monitoring central control unit carried on board the vehicle, a receive rate for frames transmitted between the wheel unit and the central unit in one revolution of the wheel associated with the wheel unit being established for each frame transmitted, a wheel angle encoding independent of the transmission being in any case performed in order to measure the true rotation of the wheel at a given instant, wherein a string of successive frames providing full angular coverage of the associated wheel is transmitted from the wheel unit, the receive rate being analyzed in order to detect at least one radiofrequency black spot indicating a position of the wheel where reception quality is below a threshold, the angle encoding providing an angle of rotation of the wheel at the instant of detection of said at least one black spot.

* * * * *